Patented Feb. 8, 1938

2,108,018

UNITED STATES PATENT OFFICE 2,108,018

VULCANIZATION OF RUBBER

Thomas C. Morris, Akron, Ohio, assignor to Wingfoot Corporation, Wilmington, Del., a corporation of Delaware No Drawing. Application October 31, 1935, Serial No. 47,639

17 Claims. (Cl. 18—53)

This invention relates to a method of treating rubber. More particularly it relates to a method of compounding and vulcanizing rubber.

One object of the invention is to provide an accelerator mixture which is capable of a very superior degree of dispersion in the rubber mix. Another object is to increase the uniformity of cure of the finished rubber. Still another object is to make possible the use of an accelerator which does not require the usual careful control of particle size. Other objects and advantages will appear as the description proceeds.

It is well known that mercapto aryl thiazoles are excellent accelerators of the vulcanization of rubber. Representative accelerators of this type include 1-mercaptobenzothiazole, 4- or 5-nitro 1-mercaptobenzothiazole, 4- or 5-chlor 1-mercaptobenzothiazole, 3- or 5-methyl 1-mercaptobenzothiazole, 4-chlor 5-nitro 1-mercaptobenzothiazole, 3- or 5-ethoxy 1-mercaptobenzothiazole, 3- or 5-methoxy 1-mercaptobenzothiazole, 1-mercapto alpha or beta naphthathiazole, etc.

It is also well known that in order that these accelerators function properly they must be added to the rubber mix in company with a metal oxide, which is usually zinc oxide (but may be cadmium or lead oxides, etc.) and a monobasic saturated or unsaturated fatty acid preferably a higher fatty acid such as stearic, oleic, palmitic, linoleic, lauric, although the lower members above acetic acid such as propionic, butyric, etc. may also be used.

The present invention is based upon the discovery that at the temperature of vulcanization the mercapto aryl thiazole, the metal oxide, and the fatty acid react at least as far as to form the metal salts of the thiazole and the acid to give a material which is completely soluble in the rubber in the quantities ordinarily employed.

This reaction does not take place at milling temperatures. Therefore, in the regular procedures as previously practiced, dispersion of this type of accelerator has depended upon mechanical distribution of the solid particles. The degree of dispersion obtainable has thus been a function of the particle size of the accelerator as well as of the amount of mechanical working applied. This has necessitated a painstaking pulverizing and sifting control with attendant trouble and expense. In the vulcanization, perfect uniformity of cure has been dependent upon close juxtaposition of alternate accelerator and metal oxide particles (the fatty acid being already in solution) and diffusion through the thin separating films of rubber during the reaction. Large individual particles or agglomerates cause non-uniform cure and hard spots.

If, however, the accelerator, zinc oxide, and fatty acid are first reacted, the mix is sufficiently soluble at milling temperatures so that many times the conventional amount of accelerator will completely dissolve in the rubber. By this means, better dispersion and much more intimate contact between rubber and accelerator are obtained.

In one example of the practice of the invention, 5 parts of 1-mercaptobenzothiazole, 5 parts of zinc oxide, and 27 parts of stearic acid were fused together, cooled, and the product ground. This material had a solubility at 80 degrees C. of 3.3 parts of mercaptobenzothiazole per 100 parts of rubber and at 90 degrees C. 3.8 parts of mercaptobenzothiazole per 100 parts of rubber. At these same temperatures, pure 1-mercaptobenzothiazole has solubilities of 0.65 and 0.80 parts per 100 of rubber.

Other mixes using ratios of zinc stearate to zinc mercaptobenzothiazole of 10:1 and 2.84:1 (the preceding example is 5:1) showed similar results.

It will be understood that it is not intended that the invention shall be limited to the above method of preparation. The mixtures may be made by co-precipitation from solution, or by intimately grinding the preformed metal salts together. Furthermore, while 1-mercaptobenzothiazole, zinc oxide and stearic acid are preferred in the practice of the invention, other 1-mercapto aryl thiazoles, of which those previously listed are illustrative, other metal oxides and other fatty acids above acetic acid may be employed.

The materials of the invention are used in any of the standard rubber formulae, employing the usual excess of zinc oxide over the stoichiometric quantity required to form the zinc salts of the mercapto aryl thiazole and the acid. The quantities employed are the same as when the unreacted components are separately added as in existing practice.

Although only the preferred form of the invention has been described in detail, it will be apparent to those skilled in the art that the invention is not limited thereto but that various modifications may be made therein without departing from the spirit of the invention or the scope of the appended claims, in which it is intended to cover by suitable expression all features of patentable novelty inherent in the invention.

What I claim is:

1. The method of compounding rubber which comprises adding to it a mixture of zinc stearate and a compound having the formula

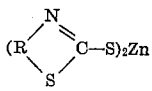

in which R is arylene.

2. The method of treating rubber which comprises adding to it a mixture of zinc stearate and a compound having the formula

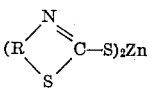

in which R is arylene and subjecting the mix to vulcanization.

3. The method of treating rubber which comprises adding to it the reaction product of a compound having the formula

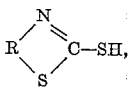

in which R is arylene, a fatty acid above acetic, and the oxide of a metal selected from the group consisting of zinc, cadmium, copper and lead and subjecting the mix to vulcanization.

4. The method of compounding rubber which comprises adding to it the reaction product of a compound having the formula

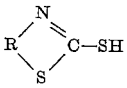

in which R is arylene, a fatty acid above acetic, and the oxide of a metal selected from the group consisting of zinc, cadmium, copper and lead.

5. The method of compounding rubber which comprises adding to it a mixture of the salts of a compound having the formula

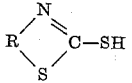

in which R is arylene and a fatty acid selected from the group consisting of stearic, oleic, palmitic, linoleic and lauric acids with a metal selected from the group consisting of zinc, cadmium, copper and lead.

6. The method of treating rubber which comprises adding to it a mixture of the salts of a compound having the formula

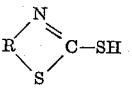

in which R is arylene; and a fatty acid selected from the group consisting of stearic, oleic, palmitic, linoleic and lauric acids with a metal selected from the group consisting of zinc, cadmium, copper and lead, and subjecting the mix to vulcanization.

7. The method of compounding rubber which comprises adding to it a mixture of the metal salts of 1-mercaptobenzothiazole and a fatty acid above acetic, the metal being selected from the group consisting of zinc, cadmium, copper and lead.

8. The method of treating rubber which comprises adding to it a mixture of the metal salts of 1-mercaptobenzothiazole and a fatty acid above acetic, the metal being selected from the group consisting of zinc, cadmium, copper and lead, and subjecting the mix to vulcanization.

9. The method of compounding rubber which comprises adding to it a mixture of zinc mercaptobenzothiazole and zinc stearate.

10. The method of treating rubber which comprises adding to it a mixture of zinc mercaptobenzothiazole and zinc stearate, and subjecting the mix to vulcanization.

11. In the process of dispersing zinc oxide, stearic acid and mercaptobenzothiazole in rubber, the improvement which comprises mixing them with the rubber in the form of zinc stearate and zinc mercaptobenzothiazole.

12. The method of compounding rubber which comprises adding to it a mixture of the zinc salt of 1-mercaptobenzothiazole and zinc laurate.

13. A rubber vulcanization accelerator composition comprising a mixture of the zinc salt of a mercapto aryl thiazole and a zinc salt of a fatty acid above acetic.

14. A rubber vulcanization accelerator composition comprising a mixture of the zinc salt of 1-mercaptobenzothiazole and a zinc salt of a fatty acid selected from the group consisting of stearic, oleic, palmitic, linoleic and lauric acids.

15. A rubber vulcanization accelerator composition comprising a mixture of the zinc salt of 1-mercaptobenzothiazole and zinc stearate.

16. A rubber vulcanization accelerator composition comprising a mixture of the zinc salt of 1-mercaptobenzothiazole and zinc laurate.

17. The method of treating rubber which comprises adding to it a mixture of a compound having the formula

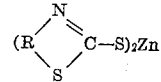

in which R is arylene, and the zinc salt of a fatty acid above acetic.

THOMAS C. MORRIS.